United States Patent [19]
Courtiol

[11] 3,795,799
[45] Mar. 5, 1974

[54] ARRANGEMENT FOR CONTROLLING PROCESSES

[75] Inventor: Bernard Courtiol, Grenoble, France

[73] Assignee: Societe Generale De Constructions Electriques Et Mechniques (Alsthom), Paris, France

[22] Filed: July 5, 1972

[21] Appl. No.: 269,144

[30] Foreign Application Priority Data
July 5, 1971 France .............................. 71.24570

[52] U.S. Cl. ............................................ 235/150.1
[51] Int. Cl. .......................................... G05b 13/02
[58] Field of Search ..................... 235/150.1, 151.12

[56] References Cited
UNITED STATES PATENTS
3,446,946    5/1969    Andeen............................ 235/150.1

Primary Examiner—Eugene G. Botz
Attorney, Agent, or Firm—Craig and Antonelli

[57] ABSTRACT

A control arrangement for processes involving a plurality of control variables and an output variable depending in a complex manner on the various control variables wherein the deviation between the output vectors of a reference model and of the process is employed and on the basis of this deviation the synthesis of the control vector is formed so that the output variables of the process will follow the output variables of the reference model without it being necessary to know the relationships between the input variables and the output variables.

10 Claims, 21 Drawing Figures

ARRANGEMENT FOR CONTROLLING PROCESSES

The present invention relates to control means for processes, in particular for processes involving a plurality of control variables and an output variable or a plurality of measurable output variables depending in complex manner on the various control variables.

Such a process is encountered for example in distilling or fractionating columns at the inlet of which a flow rate and a temperature are controlled and at the outlet of which product concentration is measured in heat exchangers in which at the inlet flow rates and temperatures are controlled and at the outlet a temperature is measured, in alternators the absorbed active and reactive energy of which is controlled and the supplied voltage and frequency of which are measured. This applies also to the piloting of a machine such as an aircraft.

In these processes, the parameters vary rapidly and the transfer matrices between input magnitudes and output magnitudes are unknown and are variable in time. Now, the control means utilized at the present day necessitate, if they are to be carried into effect, some knowledge of the relationships between input magnitudes and output magnitudes of the process.

According to the present invention, it has been found that it is possible to provide control means for monovariable or multivariable systems processing the input magnitudes or variables of the process in order that the output magnitudes or variables thereof may follow the output variables of a reference model, without it being necessary to know, a priori, the relationships existing between the input variables and the output variables. For this purpose, there is employed as main information, the deviation between the output vectors of the model and of the process and, on the basis of this deviation, the synthesis of the control vector is formed.

More precisely, the process control means according to the invention is of the type which elaborates, starting from a reference model, a process control vector which is a function of the input vector of the model, of the output vector of the process and of the generalized deviation vector (the difference between the output vector of the model and that of the process) through intermediary of proportional-term matrices, called respectively the process input matrix, the process return matrix and the generalized deviation matrix, the first or the last of the said matrices optionally being zero, and it is characterized in that it superposes on the process control vector defined hereinabove a supplementary control vector which is a function of the so-called determinate vectors constituted by the generalized deviation vector and at least one of two following vectors: the input vector of the model and the output vector of the process; and which is elaborated by a computer block comprising a linear portion processing the generalized deviation vector in such manner that the transfer matrix which would be established by the connection in series of the model and of the said linear portion is true and positive, and the nonlinear portion constituted by subassemblies each of which processes one of the components of the determinate vectors and each of which comprises, for each component of the output vector of the linear portion, a first multiplier the inputs of which receive the said component of the determinate vector and the said component of the vector of the output of the linear portion and the output of which controls, via a linear filter the transfer function of which is positive or zero at the positive true portion, a second multiplier the further input of which receives the same component of the determinate vector, the outputs of the various second multipliers of a subassembly being added together to yield the output of the said subassembly and the outputs of the various subassemblies of the nonlinear portion being added together in such manner as to constitute the supplementary control vector.

The expression "input vector" is to be understood to mean the ordinate assembly of the variables of magnitudes at the input which constitute the "components" of the input vector, and the expression "output vector" is to be understood to mean the ordinate assembly of the variables of magnitudes at the output. A matrix is an operator which establishes linear combinations between the components of the vector (input vector), so as to define a further vector (output vector), but, here, the term "matrix" is applied both to this mathematical operator and also to the means permitting the carrying into effect of the said combination and which will generally be constituted by an assembly of operational amplifiers interconnected in such manner as to satisfy the desired linear relationships.

Of course, the reference model determining the performances desired for the process must be selected in such manner as to be compatible with the process dynamics. In particular, it is necessary to take account, on selecting the reference model, of the maximum energy available for controlling the process, since the latter determines the maximum dynamic performances.

The values of the parameters of the linear and nonlinear portions of the computer block are determined in such manner that the supplementary control vector undergoes rapid variations relative to the process dynamics. In differentiation from known adaptive systems, the variation velocity of the control system parameters is of the same order of magnitude as the process dynamics (the condition vectors and the parameters vary with analogous dynamics).

Further features of the invention will become apparent from the description of examples of embodiment given hereinbelow in non-limitative manner, with the aid of the accompanying diagrammatic drawings.

Figure 11:
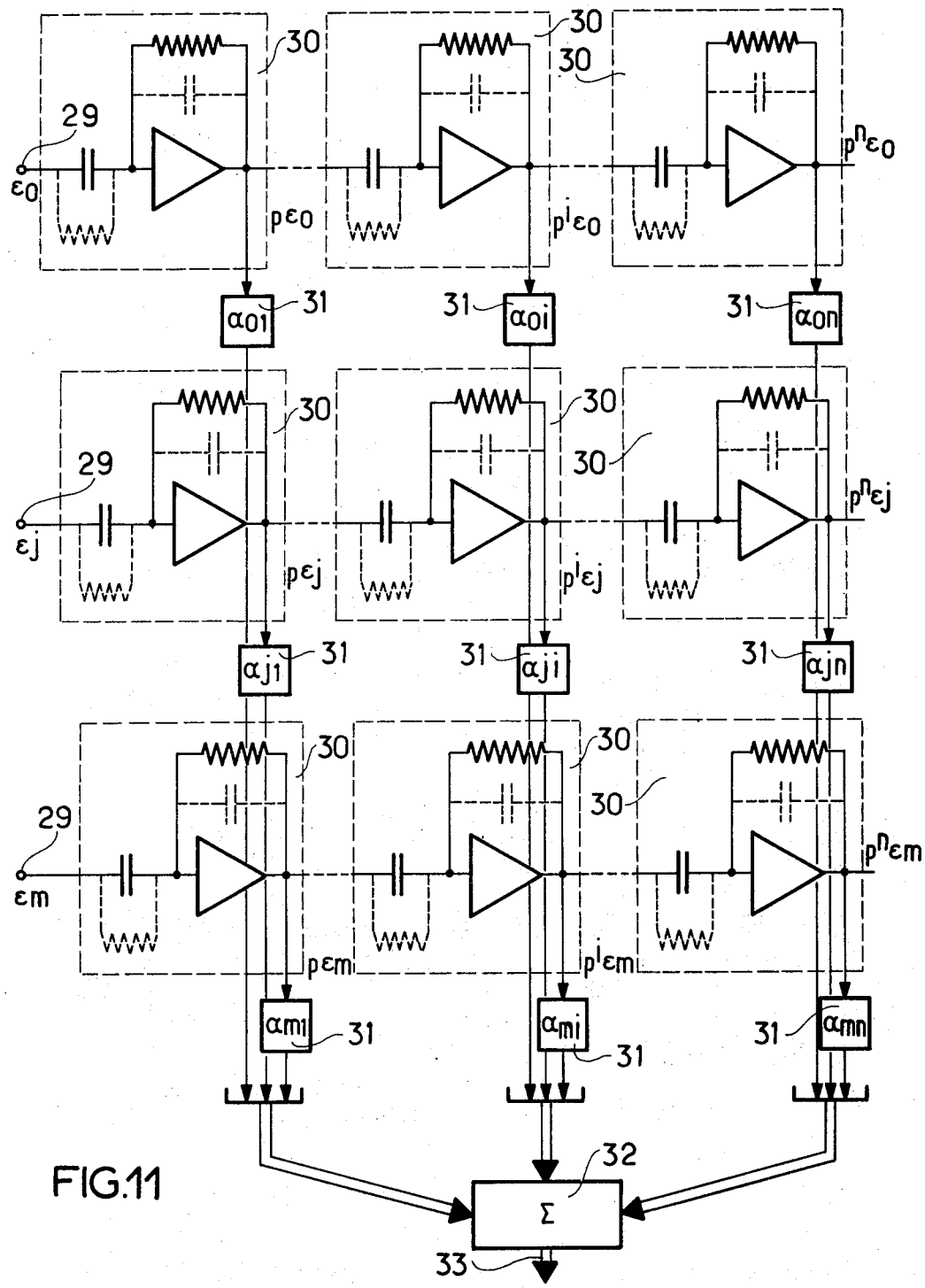
Figure 12:
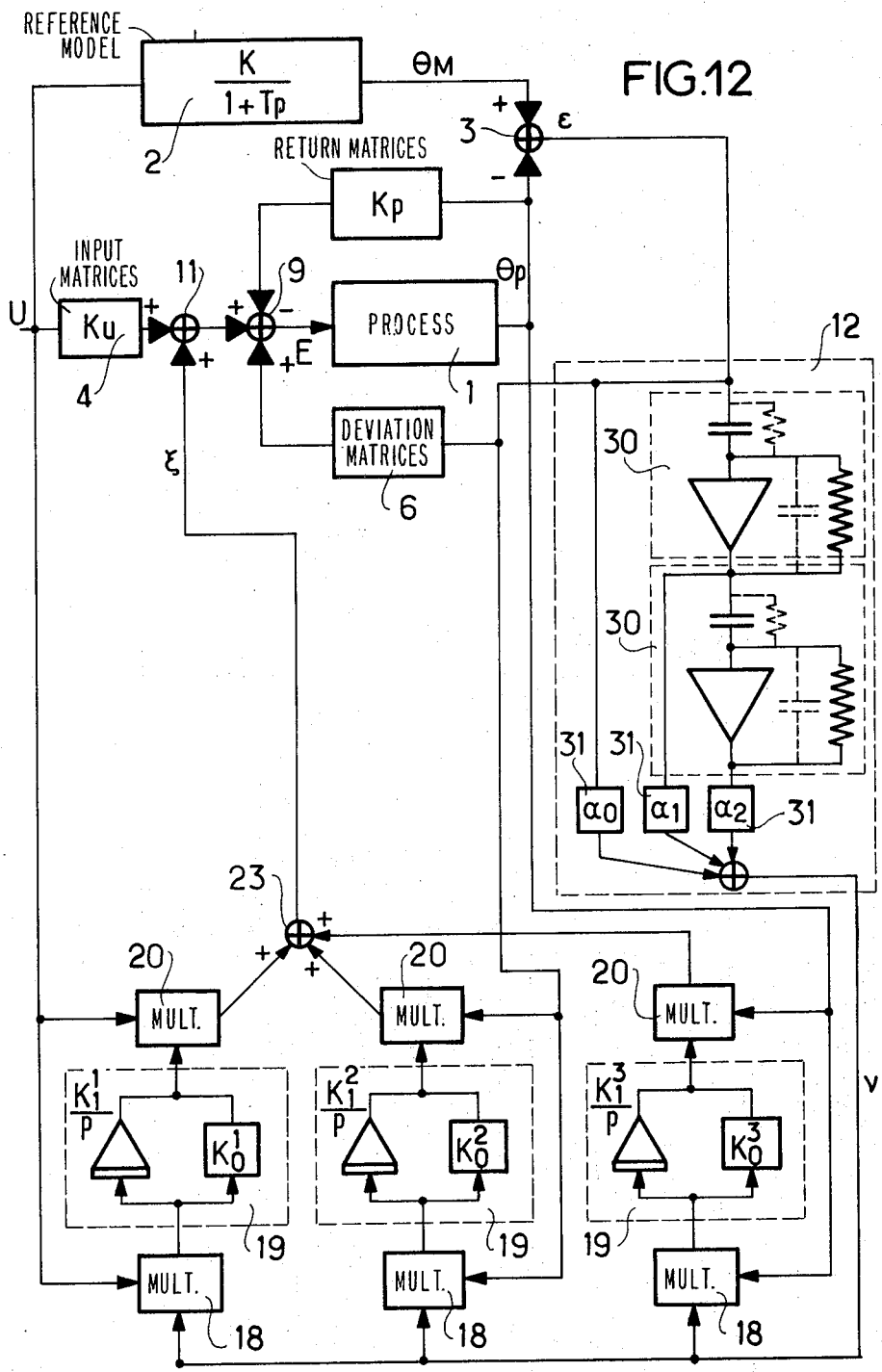
Figure 13:
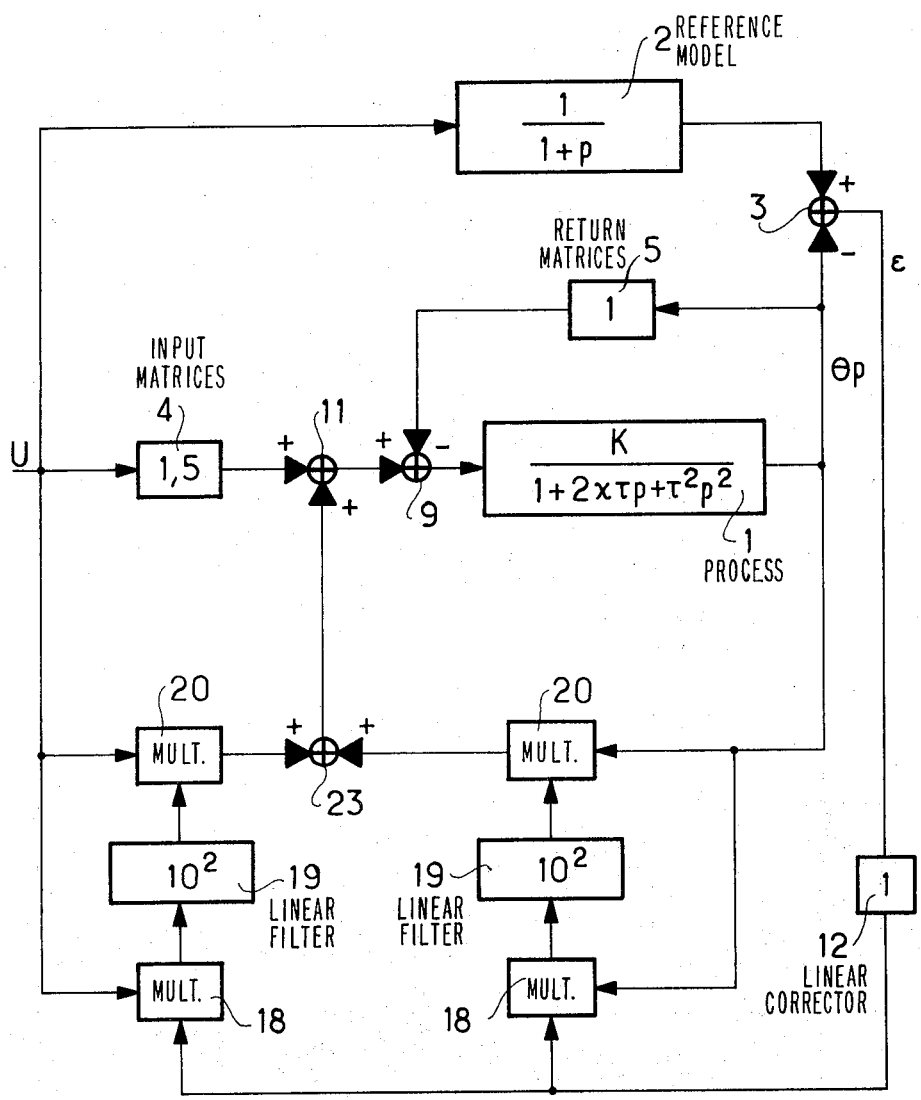
Figure 14:
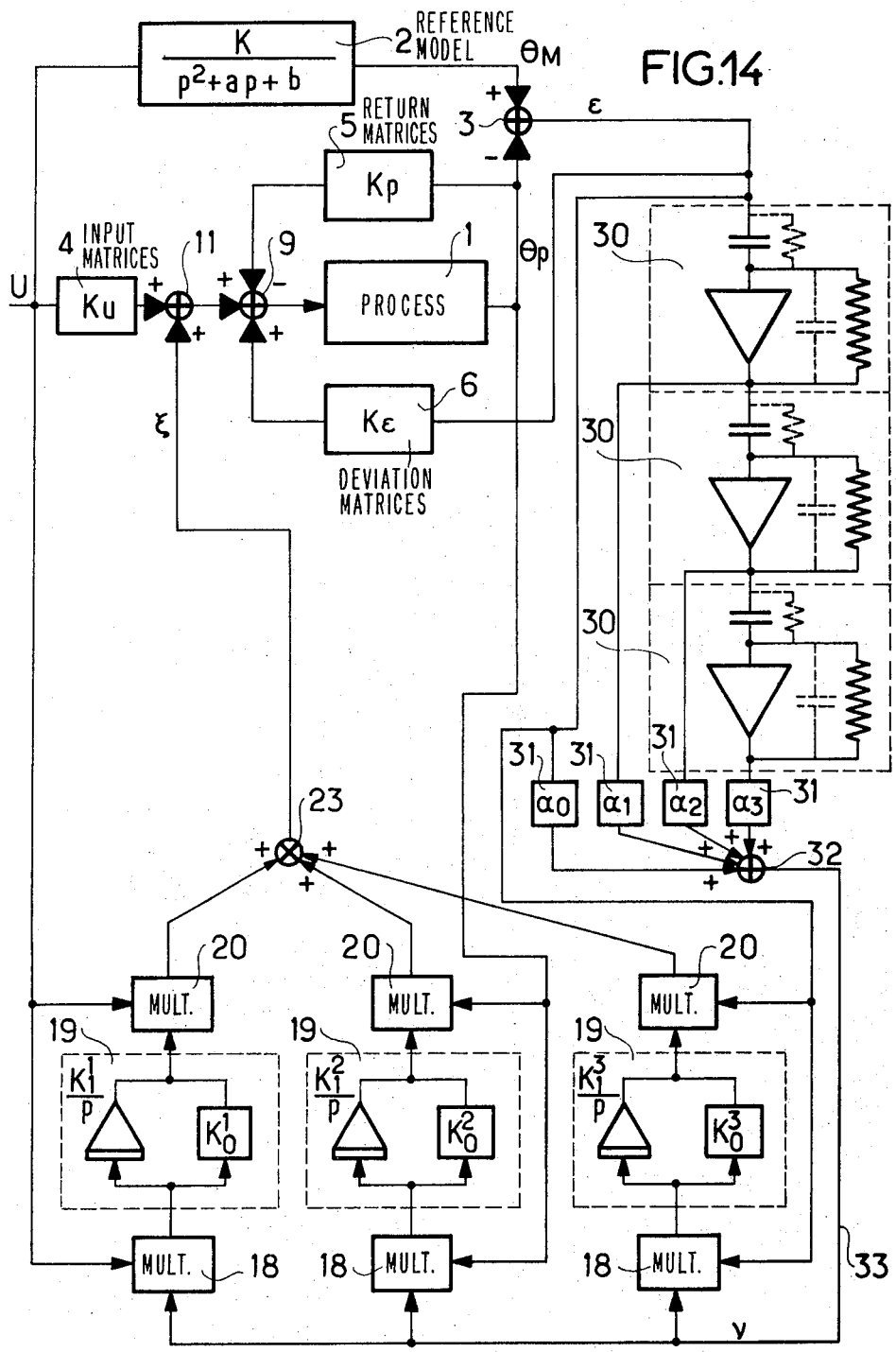
Figure 15:
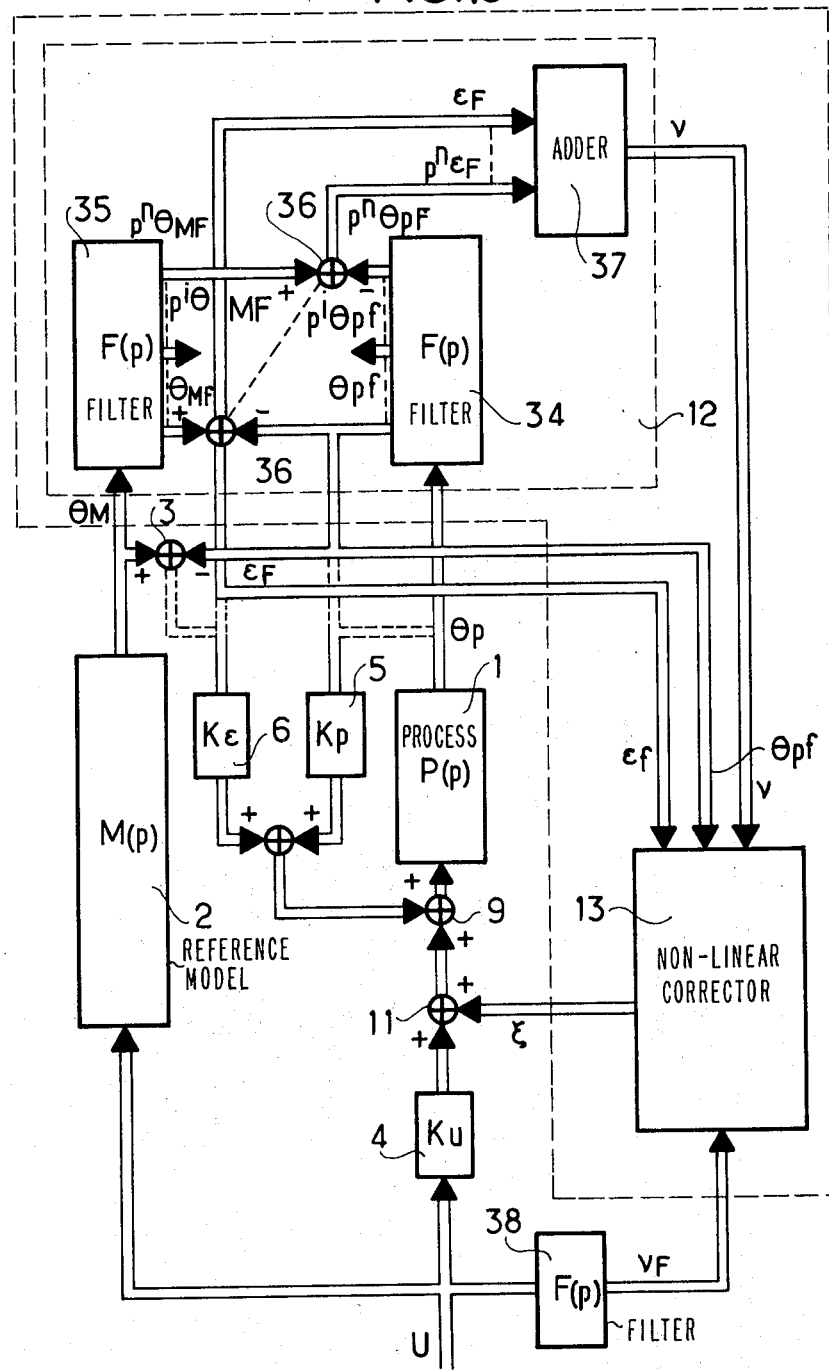
Figure 16:
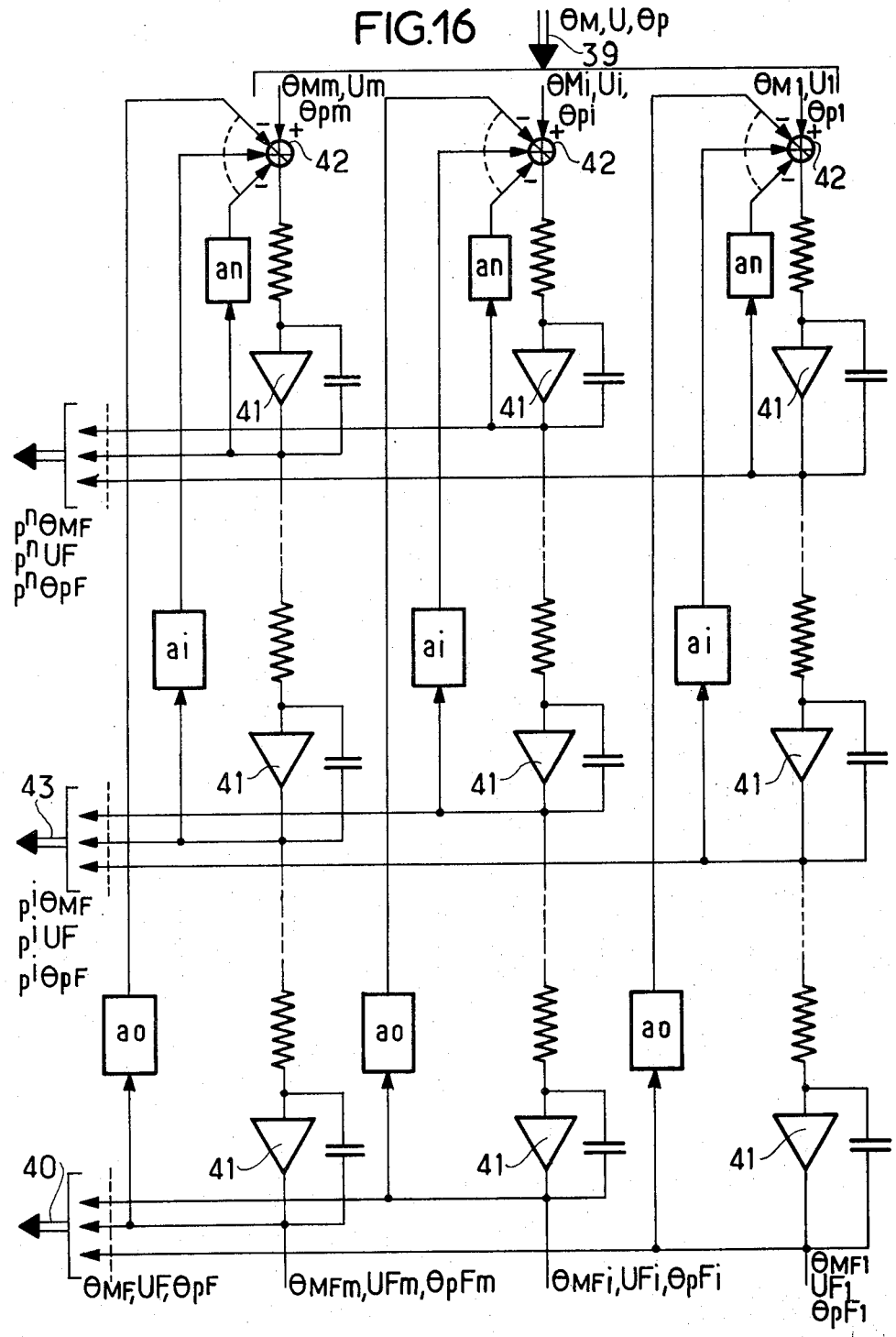
Figure 17:
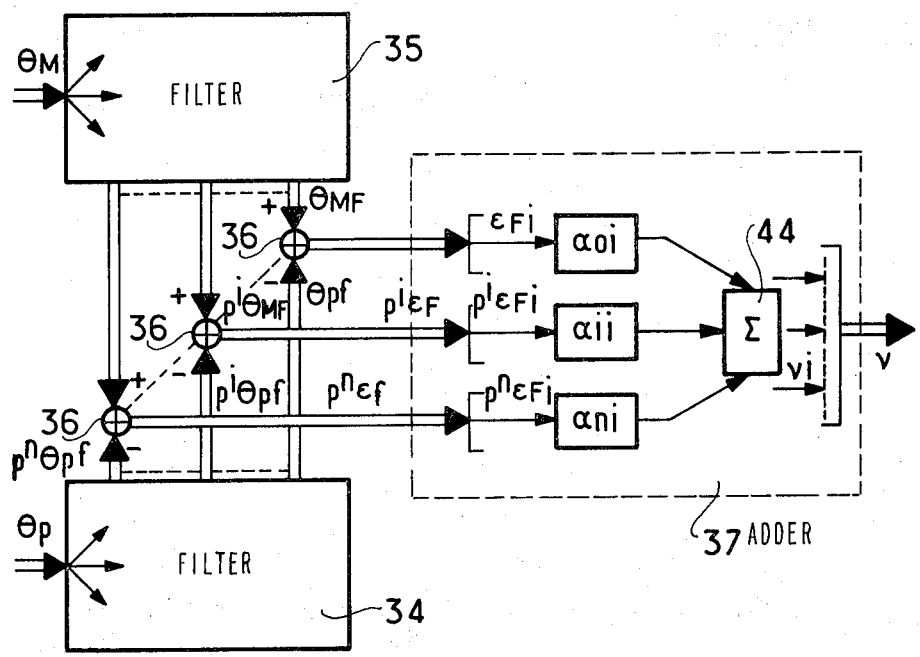
Figure 18:
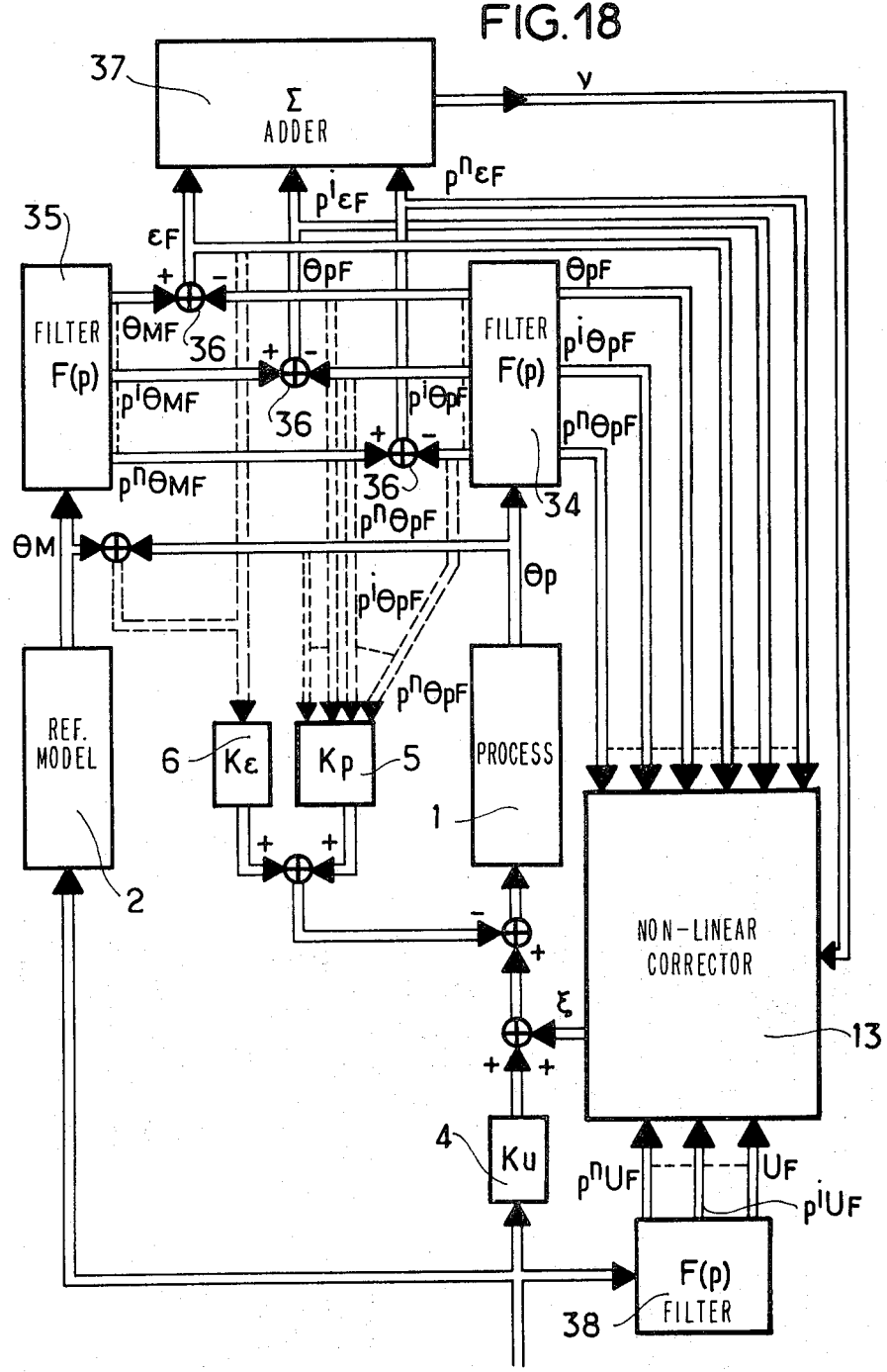
Figure 19:
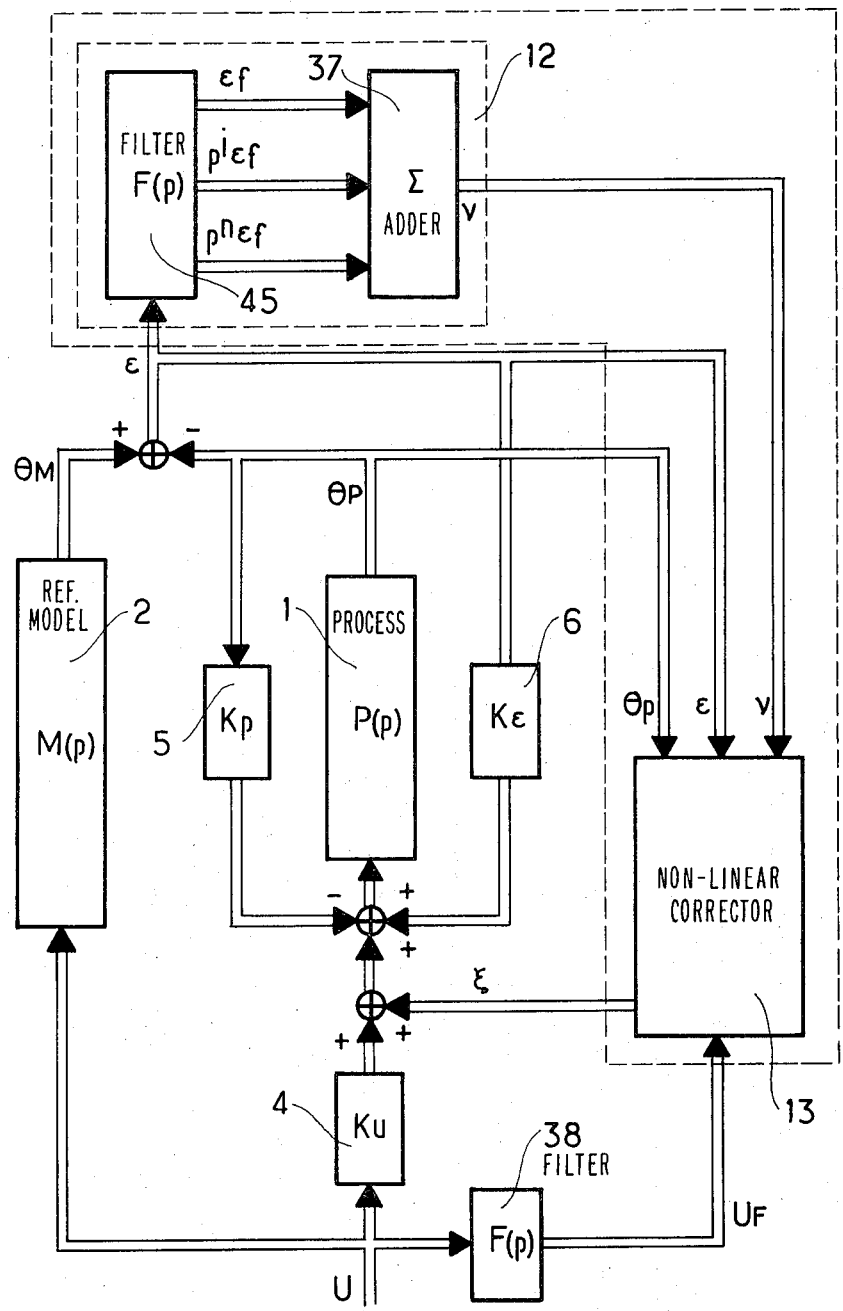
Figure 20:
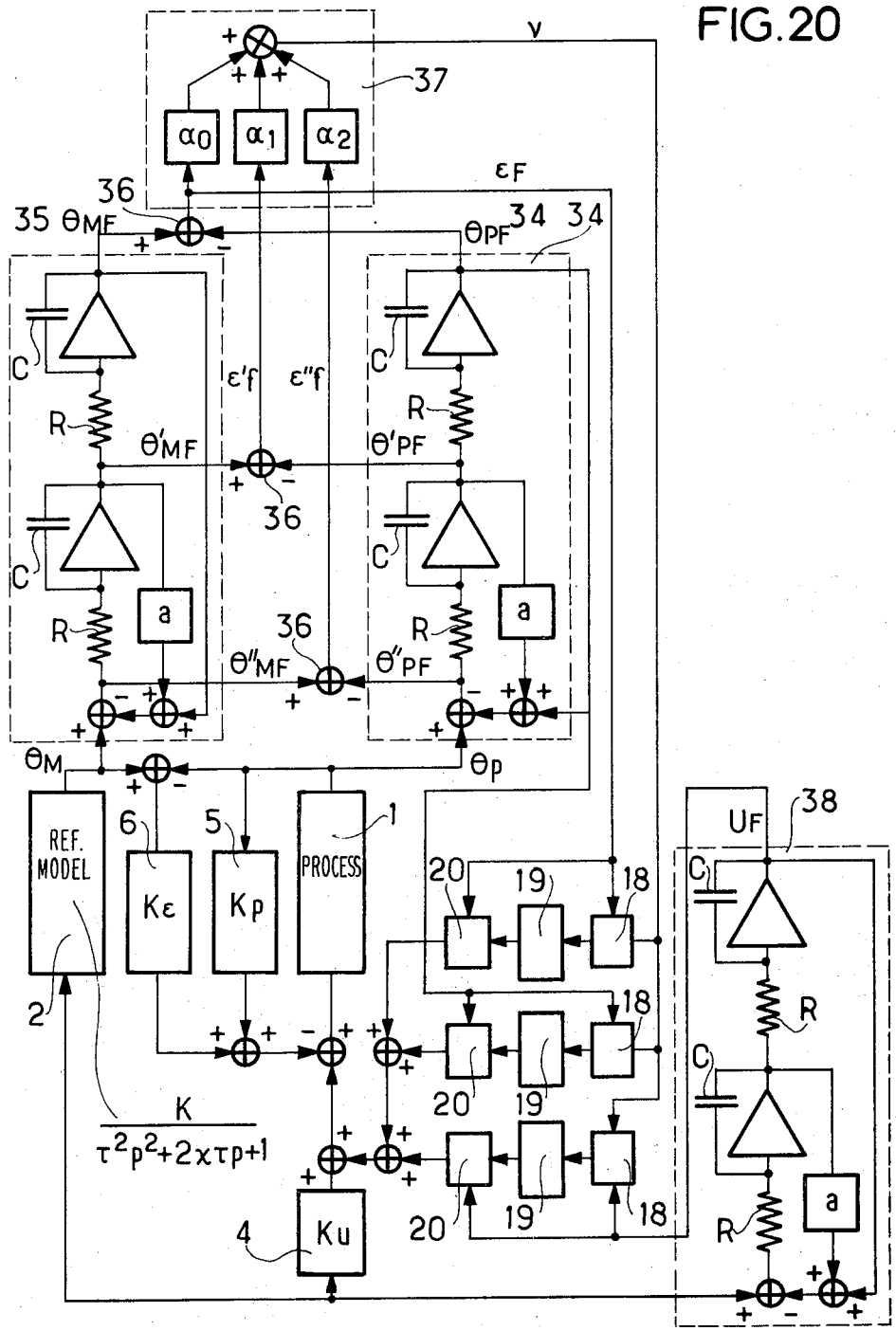
Figure 21:
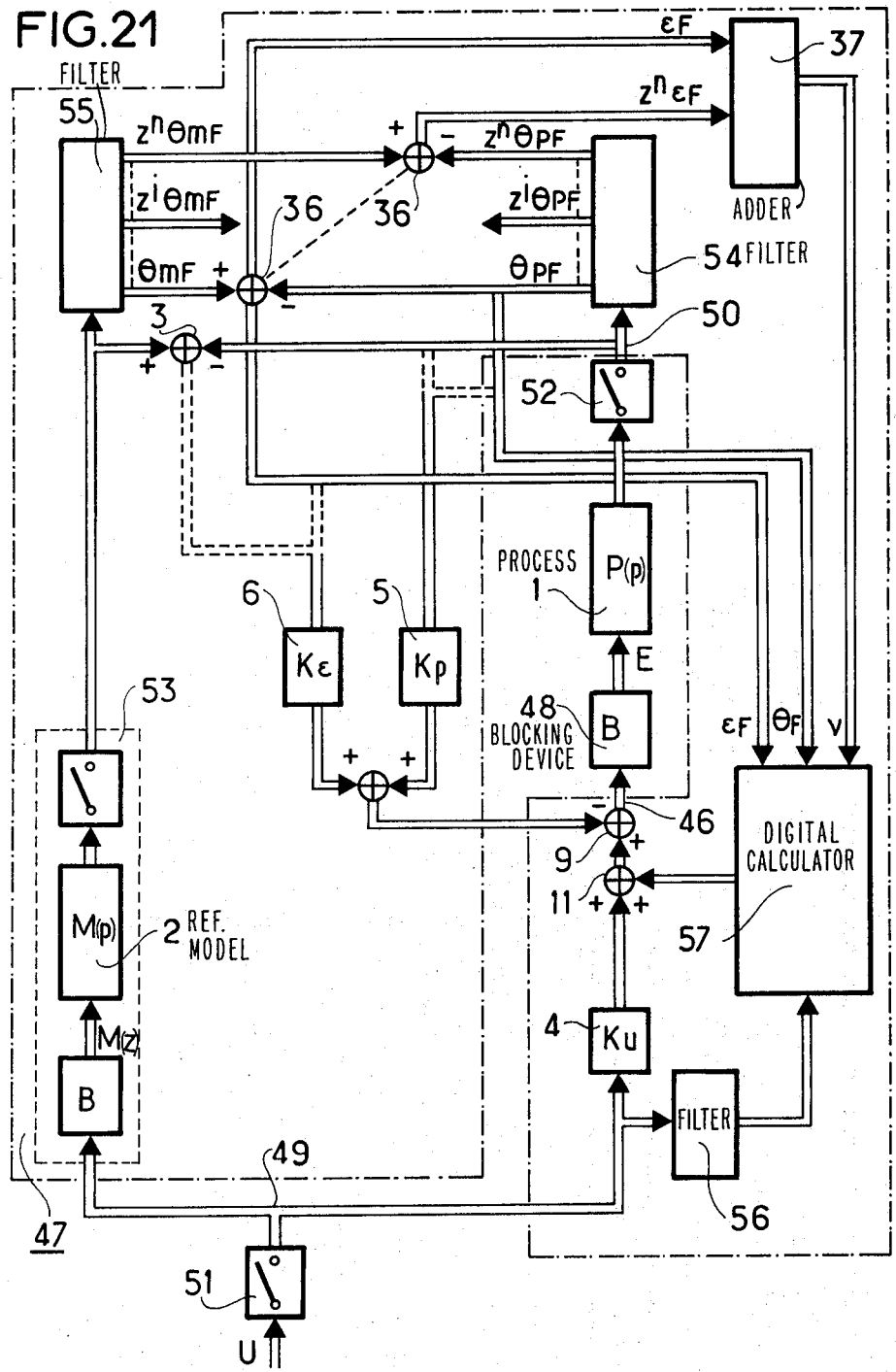

FIGS. 7, 8, 9, and 10 show examples of embodiment of the linear filters of the subassemblies of the nonlinear portion of the computer block or unit;

FIG. 11 shows the linear portion of the computer block;

FIG. 12 illustrates an example of application to a monovariable process with a model of the first order;

FIG. 13 shows a first example of application to a process of the second order having a model of the first order;

FIG. 14 shows an example of application to a monovariable process having a model of the second order;

FIG. 15 shows an overall view of control means having linear filters at the output of the process and of the model;

FIG. 16 shows the elementary structure of a linear filter;

FIG. 17 shows the assembly of filters in respect of FIG. 16, with an addition device for forming the linear portion of the computer block;

FIG. 18 is a general diagram of the control means, showing the possibilities for utilization of data available on the linear filters;

FIG. 19 is a simplified diagram of the control means in the case of dynamic behavior differing only slightly from the process without control means and from the model;

FIG. 20 shows an example, differing from that of FIG. 14, of application to a monovariable process having a second order model; and FIG. 21 shows the numerical version of FIG. 15, which is capable of being programmed on a process computer.

Figure 1:
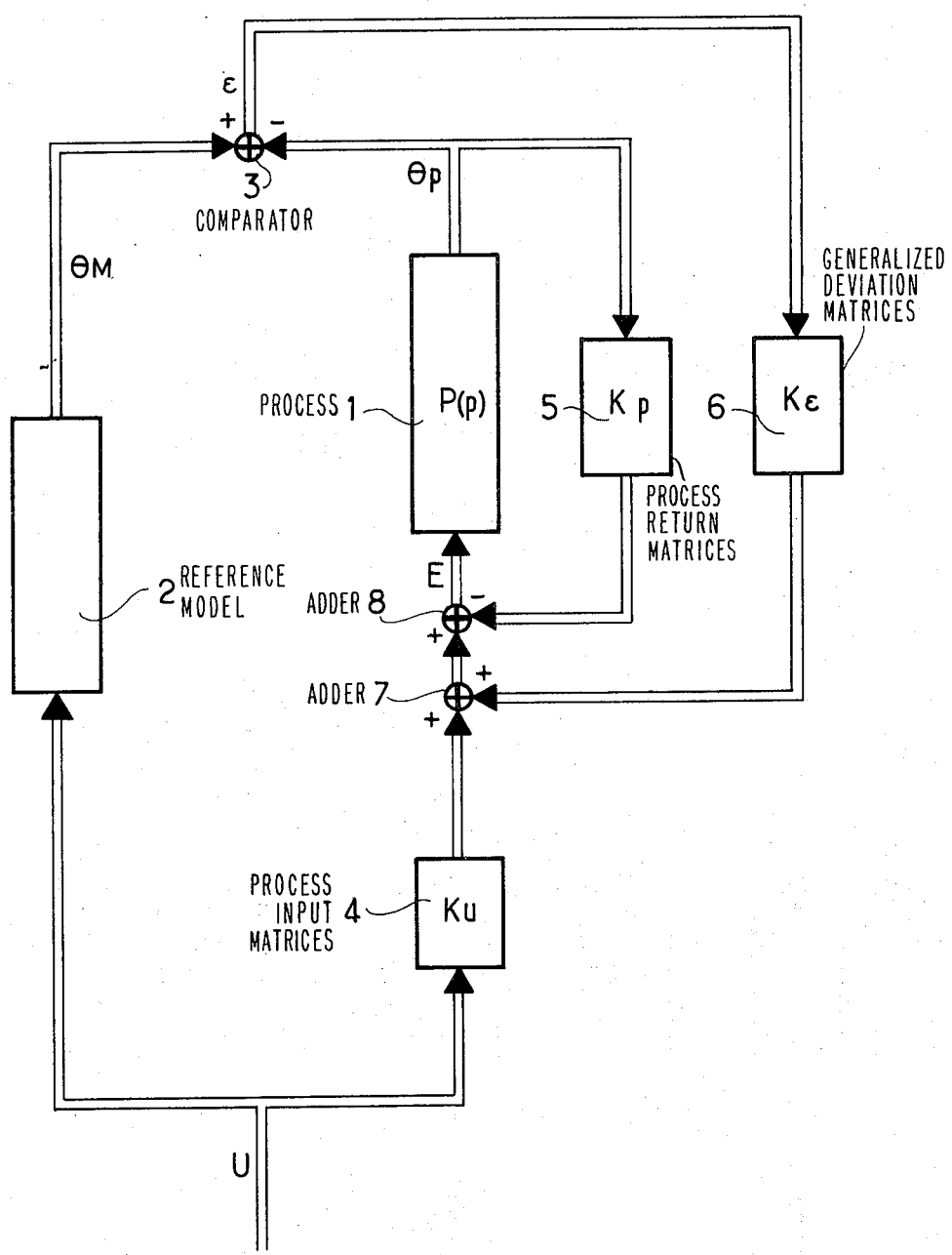
FIG. 1 shows the basic scheme of a known control means.

In the known diagram of FIG. 1, a process 1 is controlled to exhibit the same performances at those of a reference model 2. The process control vector E is processed on the basis of the input vector U of the model, of the process output vector $\theta_p$ and of the generalized deviation vector $\epsilon$ obtained in a comparator 3 receiving the vector $\theta_p$ and the vector $\theta_M$ of the model output. This processing of the vector E is effected by means of process input matrices 4, process-return matrices 5 and generalized deviation matrices 6 and also adder matrices 7 and 8.

Figure 2:
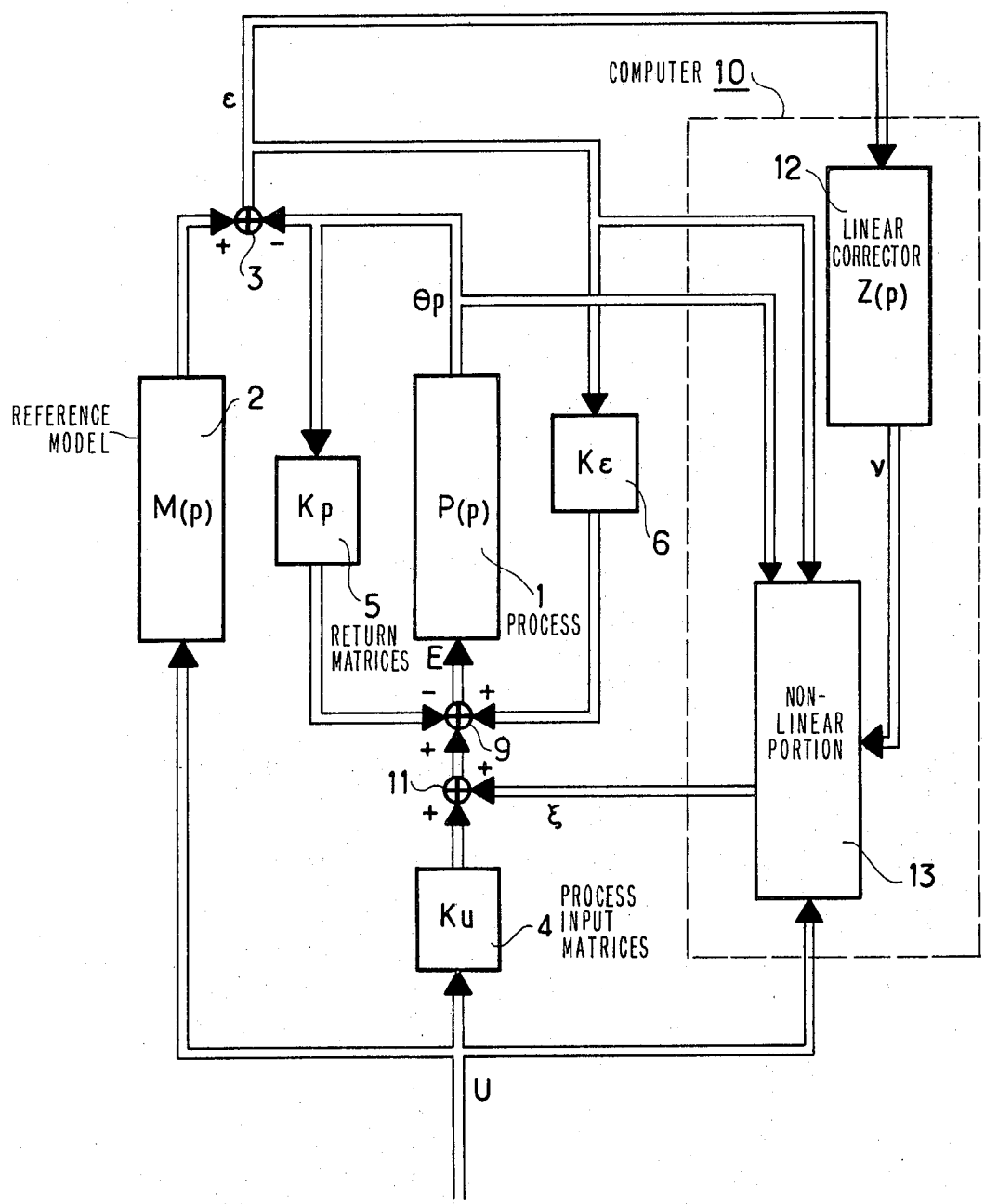
FIG. 2 shows the modifications introduced by the invention into the said basic scheme.

The diagram of FIG. 2 contains the elements of FIG. 1, i.e., matrices 4, 5, and 6 the outputs of which are added in an adder 9. However, there has been introduced, according to the invention, a computer block or unit 10 processing a supplementary control vector $\xi$ added, in an adder 11, to the control vector E according to FIG. 1.

The said computer block 10 consists of a linear portion constituted by a linear corrector 12 receiving the generalized deviation vector $\epsilon$ and providing for hyperstability of the system, and of a non-linear portion 13 receiving the output vector $v$ of the linear corrector 12 the input vector U of the model, the output vector $\theta_p$ of the process and the generalized deviation vector $\epsilon$, and supplying the supplementary control vector $\xi$.

Figure 3:
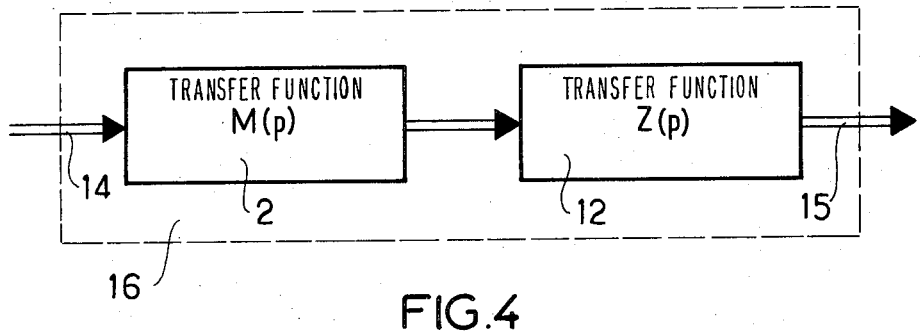
FIG. 3 is a symbolic diagram utilized for determining the linear portion of the computer block or unit.

FIG. 3 is a symbolic diagram permitting determination of the linear corrector 12. If there were connected in series between an input 14 and an output 15, as shown in this figure, the transfer function M (p) model 2 and the transfer function Z (p) linear corrector 12, the transfer matrix 16 obtained between the input 14 and the output 15 Z(p).M(p) would be true and positive. Thus, Z(p) is determined as a function of the model 2. Z(p) produces a plurality of successive derivations of the generalized deflection vector $\epsilon$, and there will be given later an embodiment of the linear corrector 12 involving linear filters, whereby it becomes possible to eliminate the disadvantages due to the noise present on the output vector of the process.

Figure 4:
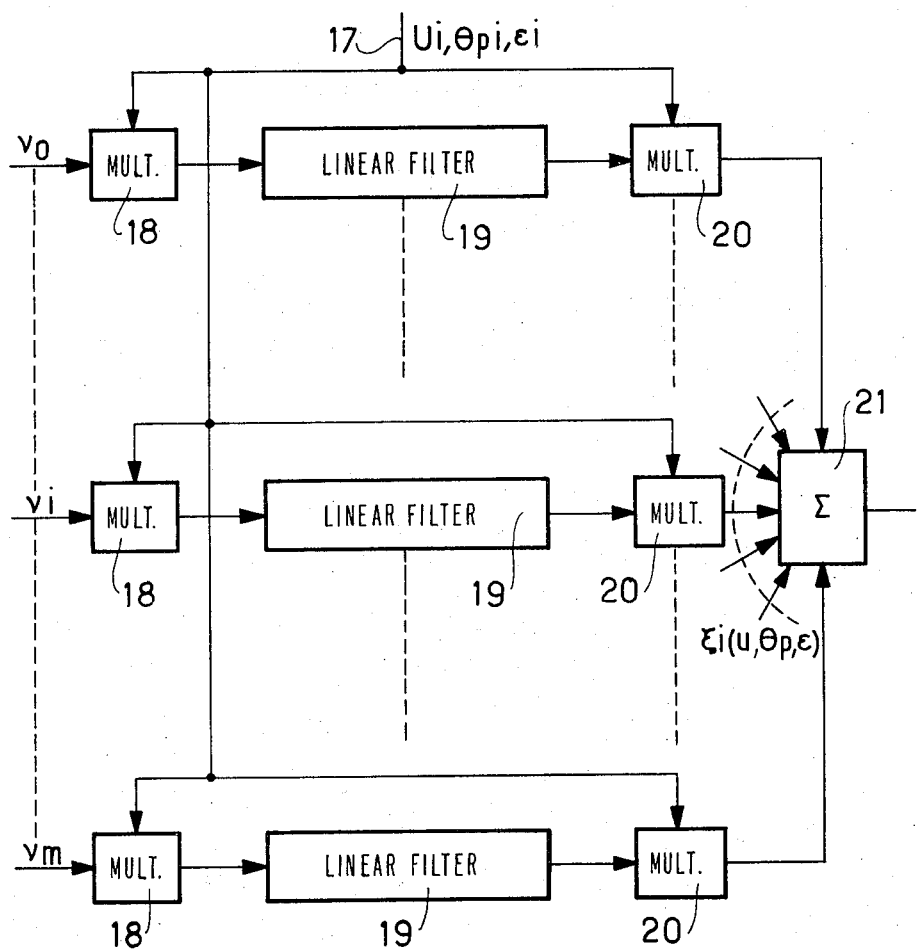
FIG. 4 shows a subassembly of the nonlinear portion of the computer block.

FIG. 4 shows a subassembly of the nonlinear portion 13, referring to one of the components $U_i$, $\theta_{pi}$ or $\epsilon_i$ of the input vector of the model, of the output vector of the process or of the generalized deviation vector, this component arriving at 17. The said subassembly consists of a predetermined number of groups each composed of the following elements connected in series: a first multiplier 18, a linear filter 19 characterized by a transfer matrix having a true positive or zero portion, and a second multiplier 20. Each of these groups of elements receives the component arriving at 17 and one of the components $v_o$ to $v_m$ of the output vector $v$ of the linear corrector 12. The outputs of the various groups are summated in summation means 21 to afford a partial component of the supplementary control vector $\xi$: $\xi_i$ (U), $\xi_i$ ($\theta_p$) or $\xi_i$ ($\epsilon$), depending on whether the subassembly is processing the vector U, the vector $\theta_p$ or the vector $\epsilon$.

Figure 5:
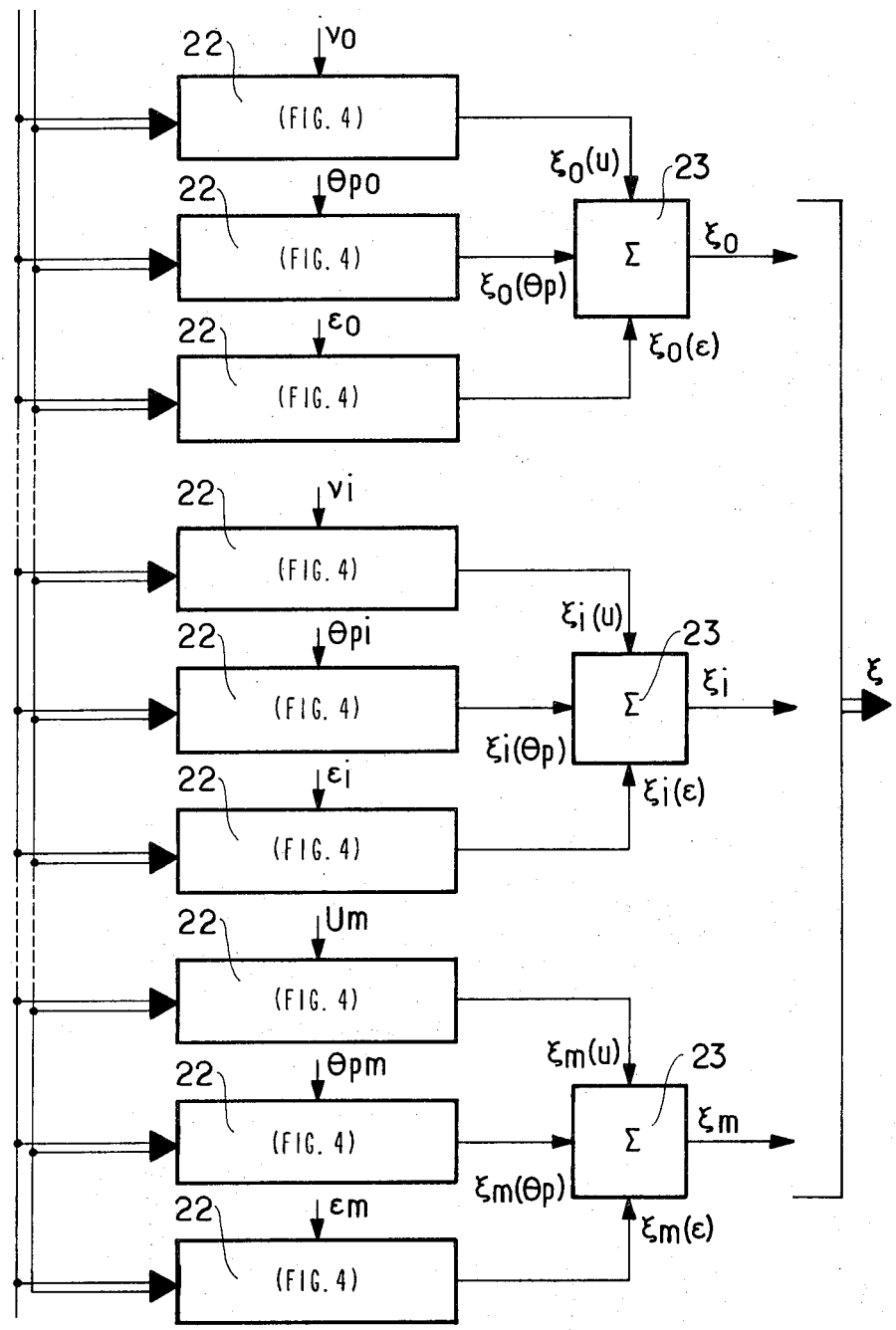
FIG. 5 shows the association of the subassemblies of FIG. 4.

FIG. 5 shows the association of subassemblies 22 such as that of FIG. 4 with summation means 23 each receiving a partial component $\xi_i$ (U), a partial component $\xi_i$ ($\theta_p$) and a partial component $\xi_i$ ($\epsilon$) and supplying one of the components $\xi_o$ to $\xi_m$ of the supplementary control vector $\xi$.

Figure 6:
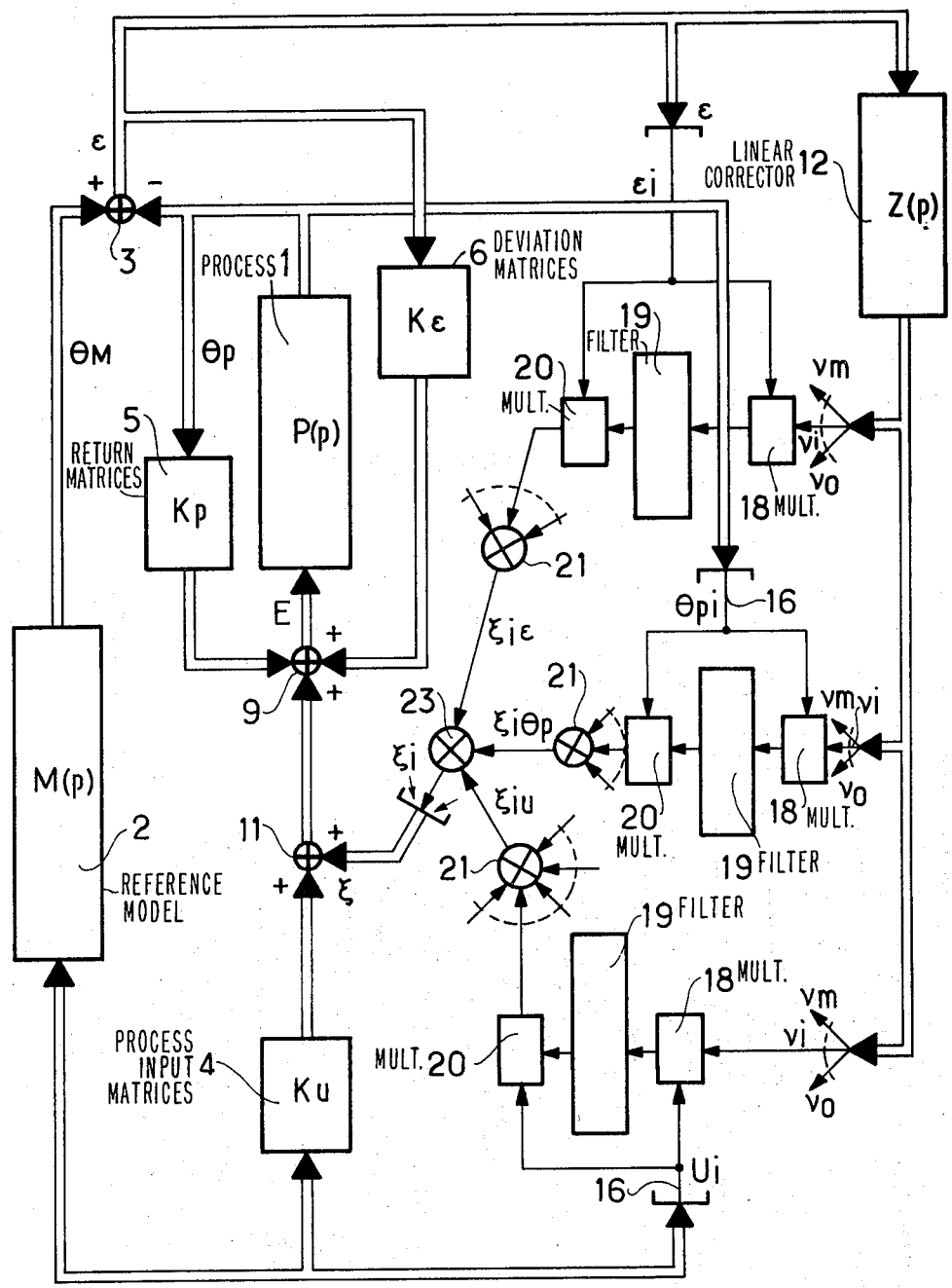
FIG. 6 is a general diagram of the control means, again showing the subassemblies of FIG. 4 and the association thereof in accordance with FIG. 5.

FIG. 6 is a general diagram of the control system according to that of FIG. 2, wherein there is shown the internal structure of the nonlinear portion 13 as apparent from FIGS. 4 and 5, employing the same reference numerals and the double lines designating a vector whereas the single lines designate a vector component.

Figure 7:
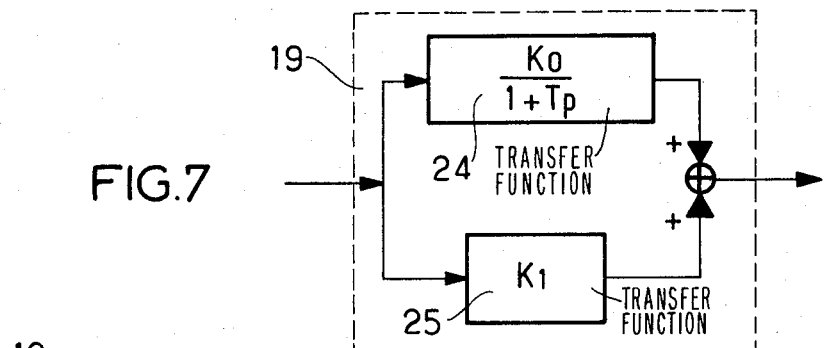

FIGS. 7, 8, 9, and 10 show examples of embodiment of the linear filter 19. In the example of FIG. 7, the linear filter 19 consists of a transfer function element 24 $K_o/1+T_p$ and a transfer function element 25 $K_1$, connected in parallel in such manner that the transfer function of the filter 19 is $$(K_o+K_1)\frac{\frac{K_1 T}{1+K_o+K_1}}{1+T_p}$$

Figure 8:
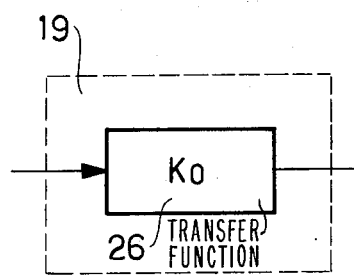
Figure 9:
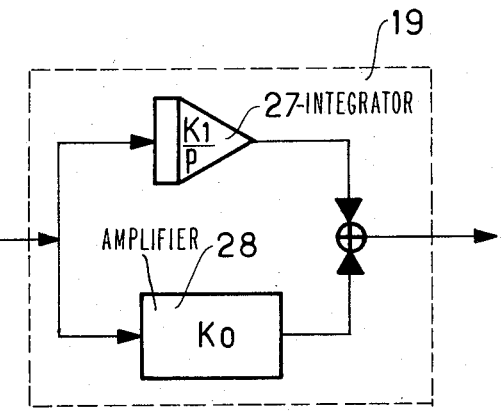
Figure 10:
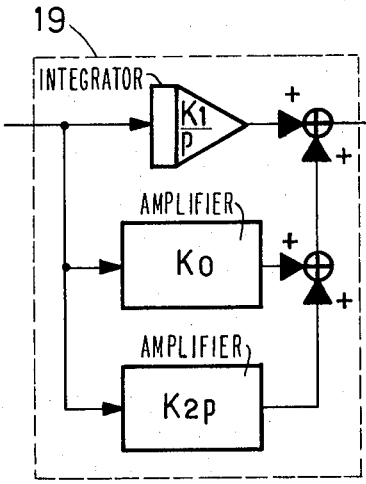

In the example of FIG. 8, the filter 19 consists of a single transfer function $K_0$ element 26. In the case of FIG. 9, two elements 27 and 28 which are associated with transfer functions respectively $K_1/p$ and $K_o$, i.e., an integrator and a gain, are connected in parallel and impart to the filter the transfer function $K_o\,p+K_1/p$. In the example shown in FIG. 10, the filter is a P.I.D. corrector having the transfer function $K_2 p^2 + K_o\,p+K_1/p$ FIG. 11 shows the diagram of a linear corrector 12 of a type which may be utilized in the case of FIG. 6. The said corrector comprises, for a component $\epsilon_j$ of the vector $\epsilon$, an assembly of successive shunting devices connected in series, starting from the input 29 of the corrector; the said shunting devices have all been given the reference 30. Their number depends on the number n of successive shunts to be effected (in accordance with the expression of Z(p) calculated by the process mentioned with reference to FIG. 3). The output of each shunting means 30 is associated with means 31 of appropriate coefficient: $\alpha_{oo} \ldots \alpha_{mn}$, and the outputs of the means 31 are added in predetermined manner by the matrix Z(p) in summation means 32, to produce at 33 the output vector $v$ of the corrector 12.

FIG. 12 shows an example of application to the control of a monovariable process the technological characteristics of which permit presentation of the same dynamic behavior as a model of the first order of transfer function $K/1 + T_p$. The filters 19 are of the type shown in FIG. 9 and exhibit, respectively, the transfer functions:

$(K_o p + K_1^1/p)$, $K_o^2 p + K_1^2/p$, $(K_o^3 p + K_1^3/p)$, depending upon whether what is concerned is an input signal of the model, an error signal or an output signal of the process. According to FIG. 3, the corrector 12 is defined by a transfer function having the form $\alpha_o + \alpha_1 p + \alpha_2 p^2$, $\alpha_o$, $\alpha_1$, and $\alpha_2$, such that $\alpha_o + \alpha_1 p + \alpha_2 p^2/1 + T_p$ is a true positive function.

FIG. 13 shows application to the control of a process of the second order $$K/1+2 X_p + 2_p 2$$

with for example $k$ comprised between 2 and 1, X equal to approximately 0.9 and $\tau$ comprised between 0.5 and 2 seconds, since the model is of the first order, having the time constant $T = 1s$ and unit gain. In this practical application, the control means of the process have been simplified by omitting the generalized deviation matrix 6 and eliminating the contribution of the generalized deviation to the synthesis of the supplementary control signal $\xi$, and by utilizing purely proportional transfer functions, equal for example to $10^{2}$ in the linear filters 19 of the nonlinear portion of the computer block.

Due to the fact that the model is of the first order, the linear corrector 12 may be reduced to a single gain $\alpha_o$.

FIG. 14 provides an example of application to the control of a monovariable process capable of exhibiting the same dynamic behavior as a model of the second order of transfer function $K/p^2+ap+b$. The transfer functions of the filters 19 are the same as in the example of FIG. 12 and the transfer function of the linear corrector 12 is: $\alpha_o + \alpha_1 P + \alpha_2 p^2 + \alpha_3 P^3$, $\alpha_o$, $\alpha_1$, $\alpha_2$ and $\alpha_3$ being calculated as a function of the selected reference model, in accordance with the process indicated with reference to FIG. 3.

In order that the system may be a high-speed system, the shunting means 30 must have a wide pass band, and the result of this is an extremely disadvantageous influence of the noise present on the output vector of the process. Thus, it is preferable to dispose linear filters acting on the output of the process and on the output of the model, as shown in FIG. 15, wherein the said filters are designated respectively by reference numerals 34 and 35.

The said linear filters, which are identical with each other, are selected in such manner that each of their output signals (which are components of the output vector) depends on only one input signal (which is a component of the input vector in the filter) through intermediary of an identical transfer function for all these components and, reciprocally, each input signal of the filter controls only a single output signal of the filter through intermediary of the same transfer function. In this way, the transfer matrix of the filter is defined as being diagonal and having all its terms equal. The order selected for the identical transfer functions composing a filter is such that it is possible to dispose thereon sections providing a measurement of a sufficient number of successive shunts or output vectors, this number requiring to be equal to the number of shunts $n$ which would be necessary for producing the linear portion of the computer block according to the example of FIG. 11.

There are effected in the comparators 36 the differences between the shunts of the same order of a portion $p^i$ $\theta_{MF}$ of the output vector of the filter 35 processing the output vector of the model and on the other hand $p^i$ $\theta_{pF}$ of the output vector of the filter 34 processing the output vector of the process, $p^i$ signifying that what is concerned is the $i$ th shunt and the index F signifying that what is concerned is a vector which has passed into a filter. The "assembly" of these differences is introduced into a balancing and addition device 37 the output of which is that of the linear portion 12. Such balancing, affecting each difference between vector shunts, is equal to the balancing associated with the shunt of the same order in the expression calculated for the linear portion of the computer block Z(p) (expression of Z(p) determined in accordance with the process indicated with reference to FIG. 3).

In order to retain the hyperstability properties of the system, the input vector of the model is passed, before causing it to trip the nonlinear portion 13 of the computer block, through a third linear filter 38 having a diagonal transfer matrix and the terms of which are equal to the identical terms composing the matrices of the filters 34 and 35 processing the vectors of the process output and the model output. Similarly, the process output and model output vectors passing into the nonlinear portion 13 of the computer block require to be replaced respectively by the vectors $\theta_{pF}$ and $\epsilon_F$ which have passed through the filter 34 or 35. The matrices 5 and 6 may receive respectively, in the one case the vector $\theta_p$ or the vector $\theta_{pF}$ and in the other case the vector $\epsilon$ or the vector $\epsilon_F$, these two alternatives being represented by dotted lines.

FIG. 16 shows the elementary structure of a filter. The latter receives at an input 39 the vector $\theta_M$, U or $\theta_p$, depending on whether what is concerned is the filter 35, 38, or 34. Each of $m$ components of the said vector, from $\theta_{M1}$ to $\theta_{Mm}$ or from $U_1$ to $U_m$ or from $\theta_{p1}$ to $\theta_{pm}$, is processed in an identical elementary filter, composed of means disposed vertically in the figure, to supply the components $\theta_{MF1}$ to $\theta_{MFm}$ or $U_{F1}$ to $U_{Fm}$ or $\theta_{pF1}$ to $\theta_{pFm}$ of the vector $\theta_{MF}$ or $U_F$ of $\theta_{pF}$ of output 40 of the filter. Each of the said elementary filters comprises an assembly of series-connected integrators 41 the output of which, having a coefficient $a_n$ to $a_o$, is supplied into a subtractor 42 disposed upstream of the first integrator encountered at the input side in the filter.

At the output of the various integrators of the same order $i$, calculated commencing from the output, there are obtained the $i$th shunts of various components of the output vector of the filter and, on grouping these integrator outputs of order $i$, there is constituted at 43 an $i$th shunt vector of the output vector.

The transfer function of each elementary filter, determined by the coefficients $a_o$ to $a_n$, must be such that the frequency response is as flat as possible in the pass band and that the latter is higher by at least 2 octaves relative to the pass band of the model.

FIG. 17 shows the assembly diagram of a corrector 12 constituted by two filters 34, 35 according to the filter shown in FIG. 16, and of a balancing and addition device 37. The components of the output vectors of the comparators 36 have balancing coefficients defined by the transfer function Z(p) of the corrector 12 determined in accordance with the method discussed with reference to FIG. 3, and added in summation means 44 to afford a component $\nu_i$ of the output vector $\nu$ of the corrector 12.

The introduction of filters according to the diagram of FIG. 15 permits obtaining of the measurement of some successive shunts of the vector of the process filter output, of the filter generalized deviation vector and of the filtered input model vector.

The process return matrix 5 is then able to process not solely the process output vector but also the successive shunt vectors measurable on the linear filter 34 acting on the process output vector, as indicated in FIG. 18 by dotted connecting lines connecting the outputs of the filters 34 to the input of the matrix 5. The transfer functions constituting the filters must be selected in such manner that the filter 34 acting on the process output vector plays the role of an observer, i.e., the dynamics of the said filter must be such that the dynamics of the system composed by the series connection of the process and of the filter are substantially identical to the dynamics of the process alone.

The process return matrix 5 is determined as previously, in order that, if the supplementary control vector $\xi$ synthesized by the computing block previously described in assumed to be maintained at zero, the absolute values of the components of the generalized deviation vector are supplied by quantities which are as reduced as possible. The determination of such a process return matrix may be approached, taking into account the data available a priori from the process, with the aid of optimal control theories.

It is also possible, as also FIG. 18 shows, to utilize data available on the filter 34 acting on the process output vector, for the generation of the supplementary control signal, processing in the nonlinear portion 13 of the computer block the successive shunt vectors of the output vector of the filter 34, in the same manner as the filtered process output vector, the number of groups of the first multiplier 18, the linear filter 19 and the second multiplier 20 being obviously increased. In identical manner, the utilization of the measurement of the successive shunted vectors of the generalized deviation vector available at the output of the comparator 36 and/or of the successive shunted vectors of the input vector of the model available on the filter 38 is possible, and permits an improvement in the performance of the control means in difficult cases.

If the "natural" dynamic behavior of the process looped by the matrices 4, 5, 6 is not very different from that of the model, it will be possible to simplify the diagram of FIG. 15 and to utilize a single linear filter 45 processing the generalized deviation vector in place of two filters 34 and 35 processing respectively the vector $\theta_p$ of the processed output and the vector $\theta_M$ of the model output. This simplified wiring system is shown in FIG. 19.

FIG. 20 shows an example of application to the control of a monovariable process capable of exhibiting the same dynamic behavior as a model of the second order of transfer function $$K/\tau^2 p^2 + 2\chi \tau_p + 1$$

If this example is compared with that of FIG. 12, it will be appreciated that the shunts on $\epsilon$ have been dispensed with for the processing of $\nu$ and, in the case illustrated, $\alpha_3$ has also been taken to be equal to 0, the values of $\alpha_0$, $\alpha_1$, and $\alpha_2$ being such that $\alpha_0 + \alpha_1 p + \alpha_2 p^2/\tau^2 p^2 + 2\chi \tau_p + 1$ is a true positive function.

Although the examples given hereinabove have been described in analog form, carrying into effect in digital form could equally well be effected. Thus, according to FIG. 21, which is a variant in digital form of FIG. 15, the control vector E of process 1 is obtained from the output signal 46 of a numerical calculator 37 by reconstitution with the aid of blocking means 48 of any order. The numerical calculator 47 receives two input signals 49 and 50 corresponding respectively to the input vector of the model sampled by 51 and to the output vector of the process sampled by 52. All the functions in respect of carrying into effect by the control means are then achieved in the form of programmed numerical algorithms.

Thus, the analog model 2 is replaced by its corresponding discrete expression (Z-transformed) symbolically represented by the block 53. Carrying into effect in programmed form of 53 introduces memory and delay functions and also addition and balancing operations. The analog linear filters 34, 35 and 38 are replaced by their discrete equivalents 54, 55 and 56. The algorithm which these operators describe corresponds to the cascade-connection of $n$ delays followed by a sampling period for each subassembly introducing in analog form the cascade-connection of n integrators (FIG. 16). The linear filters 19 constituting the nonlinear portion 13 of the analog computer block 10 are replaced by operators having the same structure, the analog integrators becoming numerical or digital counter-reducers in the numerical calculating block 57. The multiplication and addition operations taking place in the said numerical computer block are identical with the corresponding operations taking place in 13. In a general manner, all the balancing, addition and subtraction operations appearing in the numerical version of the control means in a manner identical with the analog system having been given the same reference numerals as in FIG. 15.

The operations are no longer effected in cabled form but in programmed form.

Naturally, all the variants of the structure shown in FIG. 15, diagrammatically illustrated in FIGS. 18 and 19 in analog form are transposable to digital form in accordance with the same process as that discussed hereinabove.

What is claimed is:

1. In an arrangement for controlling processes responsive to a plurality of control variables and controlled by a process control vector which is a function of the input vector of a model system, of the output vector of the control process system and of the generalized deviation vector formed by the difference between the output vector of the model system and that of the control process system, including a process input matrix having an input receiving said input vector, a first summing means receiving the output of said process input matrix for summing vector signals applied thereto, second summing means connected to the outputs of said model system and said control process system for summing the vector signals received, a process return matrix connected between the output of said control process system and an input of said first summing means, and a generalized deviation matrix connected between the output of said second summing means and an input of said first summing means, the improvement comprising supplementary control means connected to the outputs of said second summing means and said control process system and receiving said input vector for superimposing on the control signal applied to the input of said control process system from said first summing means a supplementary control vector which is a function of at least one of the generalized deviation vector, the model system input vector or the control process system output vector.

2. The combination according to claim 1 wherein said supplementary control means includes a computer block comprising linear corrector means for processing the generalized deviation vector so as to stabilize the system and nonlinear means connected to said linear corrector means and including a plurality of subassemblies each processing one of the components of the determinant vectors, each subassembly comprising for each component of the output vector of the linear corrector means, a first multiplier receiving said vector signals, a linear filter connected to the output of said first multiplier a second multiplier connected to the output of said linear filter, and a first adder connected to the outputs of all of the second multipliers of the respective subassembly, further including a second adder connected to all of said first adders and providing said supplementary control vector to an input of said first summing means.

3. The combination according to claim 2 characterized in that the values of the parameters of said linear corrector means and nonlinear means of the computer block adjust the supplementary control vector so that it undergoes rapid variations relative to the process dynamics.

4. The combination according to claim 3 characterized in that the linear filters of the subassemblies of the nonlinear means of the computer block are constituted by transfer function operators having a positive or zero portion.

5. The combination according to claim 4 characterized in that said linear corrector means of the computer block comprises a first linear filter processing the process output vector, a second linear filter processing the output vector of the model system, a comparator means connected between the outputs of the same order of the output vectors of the said filters and to said nonlinear means, and a balancing and addition device receiving the outputs of said comparator means and supplying the output vector of the said linear corrector means of the computer block.

6. The combination according to claim 4 characterized in that said linear corrector means of the computer block comprises a linear filter connected to the output of said second summing means for processing the generalized deviation vector and a balancing and addition device connected to receive the successive outputs of the output vector of the last linear filter and supplying the output vector of the said linear corrector means of the computer block.

7. The combination according to claim 5 characterized in that the nonlinear means of the computer block processes at least one of the determinant vectors after passage of the latter through a linear filter.

8. The combination according to claim 5 characterized in that said nonlinear means of the computer block is connected to process also the successive shunt vectors of the output vector of the linear filter processing the process output vector, the successive shunt vectors of the generalized deviation filter vector measurable on the comparators, the successive shunt vectors of the output vector of the linear filter processing the input vector of the model.

9. The combination according to claim 2 characterized in that said linear corrector means of the computer block comprises a first linear filter processing the process output vector, a second linear filter processing the output vector of the model system, a comparator means connected between the outputs of the same order of the output vectors of the said filters and to said nonlinear means, and a balancing and addition device receiving the outputs of said comparator means and supplying the output vector of the said linear corrector means of the computer block.

10. The combination according to claim 2 characterized in that said linear corrector means of the computer block comprises a linear filter connected to the output of said second summing means for processing the generalized deviation vector and a balancing and addition device connected to receive the successive outputs of the output vector of the last linear filter and supplying the output vector of the said linear corrector means of the computer block.

* * * * *